United States Patent
Gail et al.

(10) Patent No.: US 6,708,890 B2
(45) Date of Patent: Mar. 23, 2004

(54) CIRCUIT CONFIGURATION AND METHOD FOR AUTHENTICATING THE CONTENT OF A MEMORY AREA

(75) Inventors: Markus Gail, München (DE); Wolfgang Pockrandt, Reichertshausen (DE); Armin Wedel, Mering (DE); Erwin Hess, Ottobrunn (DE)

(73) Assignee: Infineon Technologies AG, Munich (DE)

( * ) Notice: Subject to any disclaimer, the term of this patent is extended or adjusted under 35 U.S.C. 154(b) by 229 days.

(21) Appl. No.: 09/821,855

(22) Filed: Mar. 30, 2001

(65) Prior Publication Data

US 2001/0030239 A1 Oct. 18, 2001

Related U.S. Application Data

(63) Continuation of application No. PCT/EP99/06802, filed on Sep. 14, 1999.

(30) Foreign Application Priority Data

Sep. 30, 1998 (EP) .............................. 98118499

(51) Int. Cl.⁷ .............................................. G06K 19/06
(52) U.S. Cl. ....................................... 235/492; 235/382
(58) Field of Search ............................. 235/492, 380, 235/382, 486

(56) References Cited

U.S. PATENT DOCUMENTS

| 4,809,225 A | * | 2/1989 | Dimmler et al. | 365/145 |
|---|---|---|---|---|
| 4,853,526 A | * | 8/1989 | Efing | 235/492 |
| 4,945,510 A | * | 7/1990 | Maeda et al. | 364/900 |
| 5,001,332 A | * | 3/1991 | Schrenk | 235/492 |
| 5,105,449 A | * | 4/1992 | Bennett et al. | 377/28 |
| 5,675,541 A | | 10/1997 | Leterrier | |
| 5,889,266 A | * | 3/1999 | Shrenk | 235/380 |

FOREIGN PATENT DOCUMENTS

| DE | 44 39 266 A1 | 4/1996 |
|---|---|---|
| EP | 0 292 658 A2 | 11/1988 |
| EP | 0 563 997 A1 | 10/1993 |
| WO | WO 89/02140 | 3/1989 |
| WO | WO 95/16238 | 6/1995 |
| WO | WO 97/21198 | 6/1997 |

* cited by examiner

Primary Examiner—Daniel St. Cyr
(74) Attorney, Agent, or Firm—Laurence A. Greenberg; Werner H. Stemer; Gregory L. Mayback

(57) ABSTRACT

A circuit configuration includes at least one nonvolatile, electrically erasable and writable memory area. Each memory area is assigned a nonvolatile, electrically writable and erasable flag memory, which is connected through an address line, a programming line and an authentication line to the assigned memory area, a programming voltage source and a data verification circuit. In the event of an alteration in the content of a memory area, the state of the associated flag memory is changed and, after verification of the programmed memory area content, the flag memory is returned to its basic state.

3 Claims, 1 Drawing Sheet

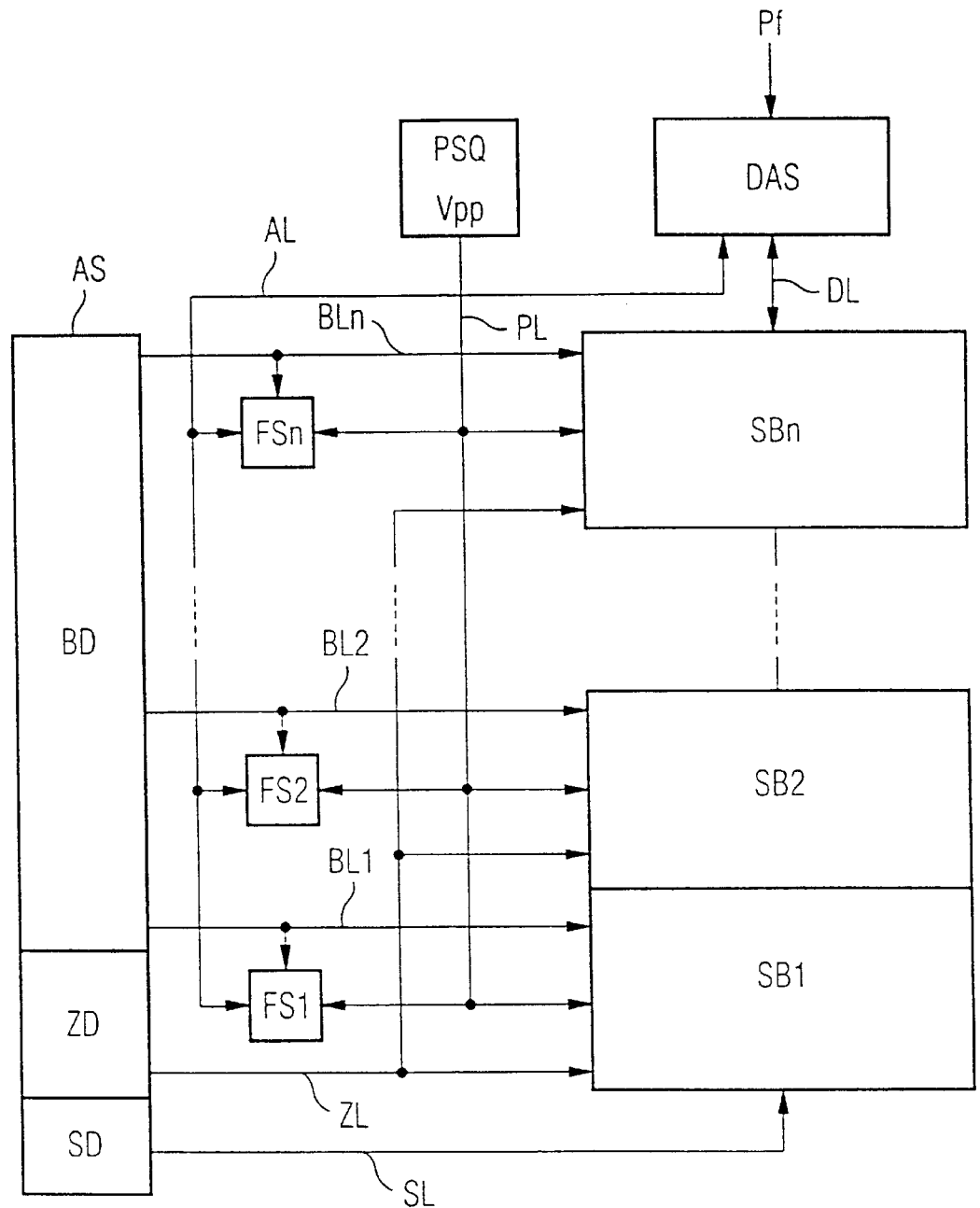

CIRCUIT CONFIGURATION AND METHOD FOR AUTHENTICATING THE CONTENT OF A MEMORY AREA

CROSS-REFERENCE TO RELATED APPLICATION

This application is a continuation of copending International Application No. PCT/EP99/06802, filed Sep. 14, 1999, which designated the United States.

BACKGROUND OF THE INVENTION

1. Field of the Invention

The invention relates to a circuit configuration having at least one nonvolatile, electrically erasable and writable memory area. An addressing circuit is assigned to the memory area and connected thereto through address lines. A programming voltage source is connected to the memory area through a programming line. The invention additionally relates to a method for authenticating the content of a nonvolatile, electrically writable and erasable memory area.

Such a circuit configuration and such a method are disclosed in German Published, Non-Prosecuted Patent Application DE 44 39 266 A1, corresponding to U.S. Pat. No. 5,889,266. In that document, the content of the memory area which is contained in a portable data carrier, for example a smart card, represents a cash value which can be increased or decreased by changing the memory area content. There is a risk of fraud and manipulation, particularly in the case of data representing cash values, but also in the case of other data.

Therefore, most applications of such data carriers demand not only the genuineness of the card and terminal but also the authenticity of the stored data. Data carriers which contain an access-protected memory area therefore require a release logic which allows or does not allow access to the protected area. In a simple case, such logic can carry out the verification of a code, as is described in International Publication No. WO 95/16238, or, in complex implementations, as in German Published, Non-Prosecuted Patent Application DE 44 39 266 A1, corresponding to U.S. Pat. No. 5,889,266, such logic can demand, prior to a release, the authentication of the terminal altering the memory content. Access must then be granted at least until a specific volume of data has been able to be transferred to the card.

A possibility of manipulating the card data arises when the data transfer is corrupted after the release of the protected area or the card is transferred to a fraudulent terminal with the voltage supply being maintained, for example through the use of a battery. Although that manipulation may be recognized and recorded by the releasing terminal, the corruption of the data by the fraudulent terminal can nevertheless not be prevented. If, in an application, there is no networking of all terminals, which can hardly be presupposed, there is the possibility of obtaining an advantage with the falsified data at a different terminal.

One solution for preventing data manipulation after the release of the protected area resides in storing the data in an encrypted manner with a signature. However, that cannot afford protection against a replay of a valuable state.

SUMMARY OF THE INVENTION

It is accordingly an object of the invention to provide a circuit configuration and a method for authenticating the content of a memory area, which overcome the hereinafore-mentioned disadvantages of the heretofore-known devices and methods of this general type and which allow reliable authentication of stored data and at the same time require little in the way of circuitry and time.

With the foregoing and other objects in view there is provided, in accordance with the invention, a circuit configuration, comprising at least one nonvolatile, electrically erasable and writable memory area. An addressing circuit is associated with the at least one memory area. Address lines are connected between the at least one memory area and the addressing circuit. A programming line is connected between a programming voltage source and the at least one memory area and is also connected between the at least one flag memory and the programming voltage source. At least one nonvolatile, electrically writable and erasable flag memory is respectively assigned to the at least one memory area. An address line is connected between the at least one flag memory and the at least one memory area. A data line is connected between the authentication circuit and the at least one memory area. An authentication line is connected between the at least one flag memory and the data authentication circuit. Upon an alteration in a content of a memory area, a state of the assigned flag memory is changed and, after authentication of a programmed memory area content, the assigned flag memory is returned to a basic state.

With the objects of the invention in view, there is also provided a method for authenticating a content of a nonvolatile, electrically writable and erasable memory area, which comprises simultaneously changing a state of a nonvolatile, electrically writable and erasable flag memory associated with to the memory area, when the memory area is changed. The flag memory returns to a basic state after authentication of the content of the memory area.

Accordingly, the circuit configuration of the invention uses permanent flag memory cells or cell complexes which indicate whether or not memory areas assigned thereto contain authenticated data. If the release operation is followed by access to a memory area which alters the data thereof, then this is recorded in the associated flag by the flag being set. Once the alteration of the data of a memory area is concluded, which can be effected both by writing and by erasure, authentication of this memory area by the terminal must be effected, which resets the assigned flag as a result.

In accordance with a concomitant mode of the invention, the flag cells are incorporated in the authentication of the corresponding memory areas. It is also possible to interrogate the state of a flag memory at a different point in time. However, for reasons of manipulation security, this should be effected in encrypted form, although this results in a greater complexity. Thus, this flag which can only be changed internally in the card can be used to check whether or not the data of an area in question has been altered by an authorized terminal.

The above-mentioned flag cells can be realized by little additional outlay on hardware. The frequency of the data authentications can be handled more flexibly, depending on the memory area size, than in the case of the above-mentioned signature method, at least as far as circuit configurations without controllers are concerned. By virtue of the smaller number of authentications, the complexity for an authentication can be made higher and the method can thus be made more secure. Furthermore, the increased security level can optionally be used by the flag cells without thereby opening up a security gap in the chip. In addition, non-erased flags point to a premature termination of the card programming, so that this information does not have to be obtained elsewhere.

Other features which are considered as characteristic for the invention are set forth in the appended claims.

Although the invention is illustrated and described herein as embodied in a circuit configuration and a method for authenticating the content of a memory area, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a block diagram of a circuit configuration according to the invention.

DESCRIPTION OF THE PREFERRED EMBODIMENTS

Referring now in detail to the single FIGURE of the drawing, there is seen a block diagram of a circuit configuration having a nonvolatile, electrically erasable and writable memory which is subdivided into a number n of memory areas SB1 . . . SBn. The memory is addressed through an addressing circuit AS, which is subdivided into an area decoder BD, a row decoder ZD and a column decoder SD. One of the memory areas SB1 . . . SBn can be selected over area lines BL1 . . . BLn through the use of the area decoder BD of the addressing circuit AS. In a corresponding manner, a corresponding memory location in the respective memory area is selected over row lines ZL and column lines SL through the use of the row and column decoders ZD, SD. Data can be written to and read from the memory areas SB1 . . . SBn through data lines DL.

A voltage Vpp is necessary in order to write data to the memory areas SB1 . . . SBn, which can be effected both by programming and by erasure. The voltage Vpp is high with regard to the customary supply voltage, is referred to hereinafter as programming voltage and is made available by a programming voltage source PSQ through programming lines PL. Each memory area SB1 . . . SBn is then assigned a flag memory FS1 . . . FSn according to the invention. In this case, each of the flag memories FS1 . . . FSn is connected to the respective area line BL1 . . . BLn. As a result, the addressing of a specific memory area is at the same time accompanied by the addressing of the assigned flag memory. In addition, each flag memory FS1 . . . FSn is connected through the programming line PL to the programming voltage source PSQ. Consequently, the corresponding flag memory is automatically programmed as well by selection of a memory area and application of the programming voltage Vpp. As a result, any change in the content of a memory area is held in the respective flag memory and can thus be ascertained.

In the event of a proper change of data in a memory area Sbi (i=1, 2, . . . n), a check is performed after the change to determine whether or not the correct data were written. For this purpose, the changed data are read out again through the data lines DL and processed in a data authentication circuit DAS to form a "signature", i.e. they are encrypted through the use of a special algorithm. The same operation takes place in a non-illustrated terminal which sends the signature determined there to a card, as is indicated by an arrow Pf, where it is compared with a signature determined there. If the data correspond, the associated flag memory FSi is addressed by the data authentication circuit DSA through an authentication line AL in such a way that the previously programmed flag memory FSi is erased again and, consequently, the changed data memory content is authenticated. Erased flag memories FS1 . . . FSn thus signify that all assigned data contents are authenticated, while a set flag points to the fact that an unauthenticated change of data has been performed in the associated memory area.

The state of the flag memory advantageously influences the signature calculation or the authentication, with the terminal having to assume a written state since data has been changed. Therefore, the terminal has to be provided with the information as to whether or not the written state is the programmed or erased state.

The invention has been described by using a circuit configuration in which the assigned flag memory is programmed in the event of a change of data in a memory area. After the authentication of the changed data content, the flag memory is erased again. However, it is equally possible for the flag memory to be erased in the event of a change in a memory area and to be programmed after the authentication.

In the example illustrated, each memory area SB1 . . . SBn is assigned a flag memory FS1 . . . FSn. This is done by connecting the flag memories FS1 . . . FSn to the area lines BL1 . . . BLn. However, it is also possible for only individual cells of a memory area to be protected against unauthorized change through the use of a flag memory by likewise feeding the corresponding column and row lines SL, ZL to the flag memory FS1 . . . FSn and suitably combining them with the assigned area line BL1 . . . BLN.

We claim:

1. A circuit configuration, comprising:

at least one nonvolatile, electrically erasable and writable memory area;

an addressing circuit associated with said at least one memory area;

address lines connected between said at least one memory area and said addressing circuit;

a programming voltage source;

a programming line connected between said programming voltage source and said at least one memory area, said programming line also connected between said at least one flag memory and said programming voltage source;

at least one nonvolatile, electrically writable and erasable flag memory respectively assigned to said at least one memory area;

an address line connected between said at least one flag memory and said at least one memory area;

a data authentication circuit;

a data line connected between said data authentication circuit and said at least one memory area; and an authentication line connected between said at least one flag memory and said data authentication circuit;

whereby upon an alteration in a content of said at least one memory area, a state of said flag memory assigned to said at least one memory area is changed and, after authentication of a programmed memory area content, said assigned flag memory is returned to a basic state.

2. A method for authenticating a content of a nonvolatile, electrically writable and erasable memory area, which comprises:

simultaneously changing a state of a nonvolatile, electrically writable and erasable flag memory associated with the memory area, when the memory area is changed; and returning to a basic state of the flag memory after authentication of the content of the memory area.

3. The method according to claim 2, which further comprises incorporating the state of the flag memory in the authentication of the associated memory area content.

\* \* \* \* \*